US006799101B2

(12) United States Patent
Hawig et al.

(10) Patent No.: US 6,799,101 B2
(45) Date of Patent: Sep. 28, 2004

(54) METHOD FOR PROGRAMMING FLASH EEPROMS IN MICROPROCESSOR-EQUIPPED VEHICLE CONTROL ELECTRONICS

(75) Inventors: Heinrich Hawig, Hannover (DE); Ulfert Ulken, Garbsen (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 10/728,722

(22) Filed: Dec. 5, 2003

(65) Prior Publication Data

US 2004/0148073 A1 Jul. 29, 2004

(30) Foreign Application Priority Data

Dec. 5, 2002 (DE) .......................................... 102 56 799

(51) Int. Cl.[7] .................................................. G06F 7/00
(52) U.S. Cl. .......................................... 701/35; 701/36
(58) Field of Search ............................. 701/29, 35, 36, 701/37, 41, 45, 51, 70, 115; 477/34, 54

(56) References Cited

U.S. PATENT DOCUMENTS 5,444,628 A * 8/1995 Meaney et al. ............. 701/109
5,915,017 A 6/1999 Sung et al.
6,165,102 A * 12/2000 Bellinger .................... 477/54
6,181,992 B1 1/2001 Gurne et al.
6,535,811 B1 * 3/2003 Rowland et al. ............ 701/115
6,728,605 B2 * 4/2004 Lash et al. ..................... 701/1

FOREIGN PATENT DOCUMENTS

| DE | 101 43 030 A1 | 3/2003 |
| EP | 0 838 739 B1 | 4/1998 |
| EP | 1 258 865 A2 | 11/2002 |

OTHER PUBLICATIONS

FLASHit–Manual ab Version 6.3, Feb. 19, 2001.

* cited by examiner

*Primary Examiner*—Richard M. Camby
(74) *Attorney, Agent, or Firm*—Kramer Levin Naftalis & Frankel LLP

(57) ABSTRACT

A method for safe programming of an electrically erasable and programmable memory (e.g., a flash EEPROM) in a control unit (e.g., a vehicle ECU) utilizing a programming data set that is read into the control unit and evaluated thereby. The programming data set contains, besides the memory-map to be programmed, an equipment description of the control units authorized for programming so that the control unit can perform an identity check to determine whether it itself belongs to the range of authorized control units. If the identity check indicates that it is authorized for programming, reprogramming is performed using a programming device provided in the control unit itself.

13 Claims, 5 Drawing Sheets

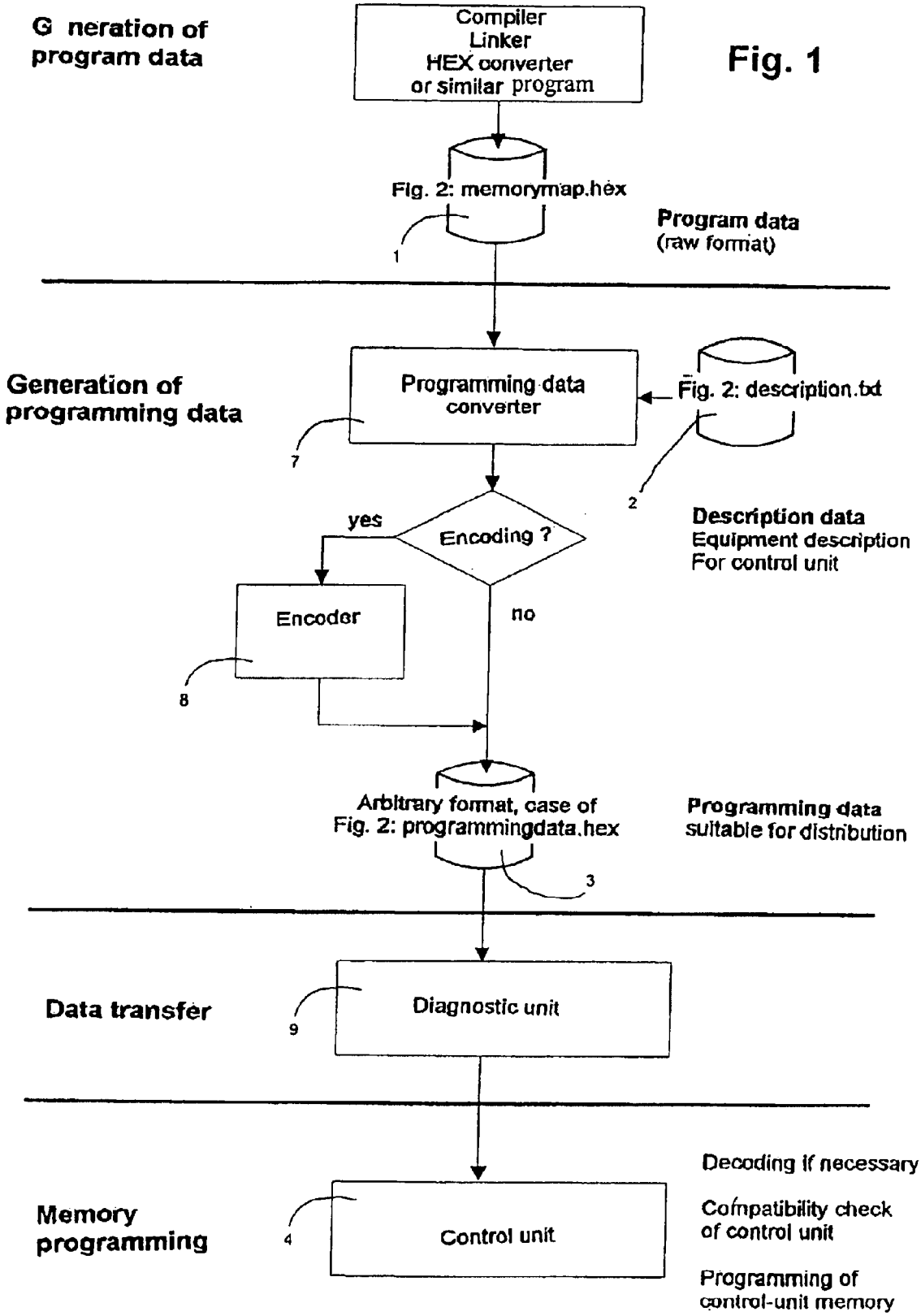

Fig. 2

Fig. 2a Memory map

| Address | Date |
|---|---|
| 80h | FFh |
| 81h | FEh |
| 82h | FDh |
| 83h | FCh |
| 84h | FBh |
| 85h | FAh |
| 86h | F9h |
| 87h | F8h |
| 88h | F7h |
| 89h | F6h |
| 8Ah | F5h |
| 8Bh | F4h |
| 8Ch | F3h |
| 8Dh | F2h |
| 8Eh | F1h |
| 8Fh | F0h |

Fig. 2b memorymap.hex Intel Hex Format

:10008000FFFEFDFCFBFAF9F8F7F6F5F4F3F2F1F0F8
:00000001FF

Fig. 2c description.txt

Input "memorymap.hex"
Output "programmingdata.hex"

Hardware number  "446 125 423 1"

Fig. 2d Content of programming data set

|   | 1 | 2 | 3 | 4 | 5 | 6 | 7 | 8 | 9 |
|---|---|---|---|---|---|---|---|---|---|
| 0 | 02h | 44h | 61h | 25h | 42h | 31h | 06h | 00h | 00h |
| 10 | 00h | 80h | 07h | 10h | FFh | FEh | FDh | FCh | FBh | FAh |
| 20 | F9h | F8h | F7h | F6h | F5h | F4h | F3h | F2h | F1h | F0h |

Fig. 2e Format of programming data set

| Record type | Length (optional) | Data | Meaning |
|---|---|---|---|
| 02h |  | 44h 61h 25h 42h 31h | Hardware product number |
| 06h |  | 00h 00h 00h 80h | Start address (32-bit) |
| 07h | 10h | FFh FEh FDh FCh FBh FAh F9h F8h F7h F6h F5h F4h F3h F2h F1h F0h | Data |

Fig. 2f programmingdata.hex Intel Hex Format

:100000000244612542310600008000071OFFFEFD1A
:0D001000FCFBFAF9F8F7F6F5F4F3F2F1F065
:00000001FF

```
Input     "memorymap.hex"
Output    "programmingdata.hex"

HardwareNumber  "446 125 433 1"
HardwareNumber  "446 125 433 2"
HardwareNumber  "446 125 433 3"
```
2a

Fig.3b

```
Input     "memorymap.hex"
Output    "programmingdata.hex"

HardwareNumber  "446 125 433 1"

SerialNumber    "305 4 123 456" - "305 4 123 699"
```
2b

Fig.3c

```
Input     "memorymap.hex"
Output    "programmingdata.hex"

HardwareNumber  "446 125 433 1"

SoftwareNumber  "246 125 430 1"
```
2c

Fig.3d

```
Input     "memorymap.hex"
Output    "programmingdata.hex"

HardwareNumber  "446 125 433 1"

SerialNumber    "305 4 123 456" - "305 4 123 699"

SoftwareNumber  "246 125 430 1"
```
2d

Fig.3e

```
Input     "memorymap.hex"
Output    "programmingdata.hex"

HardwareNumber  "446 125 433 1"
HardwareNumber  "446 125 433 2"
HardwareNumber  "446 125 433 3"

SerialNumber    "305 4 123 456" - "305 4 123 699"
SerialNumber    "305 4 123 800" - "305 4 123 999"

SoftwareNumber  "246 125 430 1"
SoftwareNumber  "246 125 430 2"
SoftwareNumber  "246 125 430 3"
SoftwareNumber  "246 125 430 4"
```
2e

Fig.3f

```
Input     "memorymap1.hex"
Output    "programmingdata.hex"

HardwareNumber  "446 125 433 1"
SoftwareNumber  "246 125 430 0"

Input     "memorymap2.hex"

HardwareNumber  "446 125 433 2"
SerialNumber    "305 4 123 456" - "305 4 123 699"
SoftwareNumber  "246 125 430 1"
```
2f

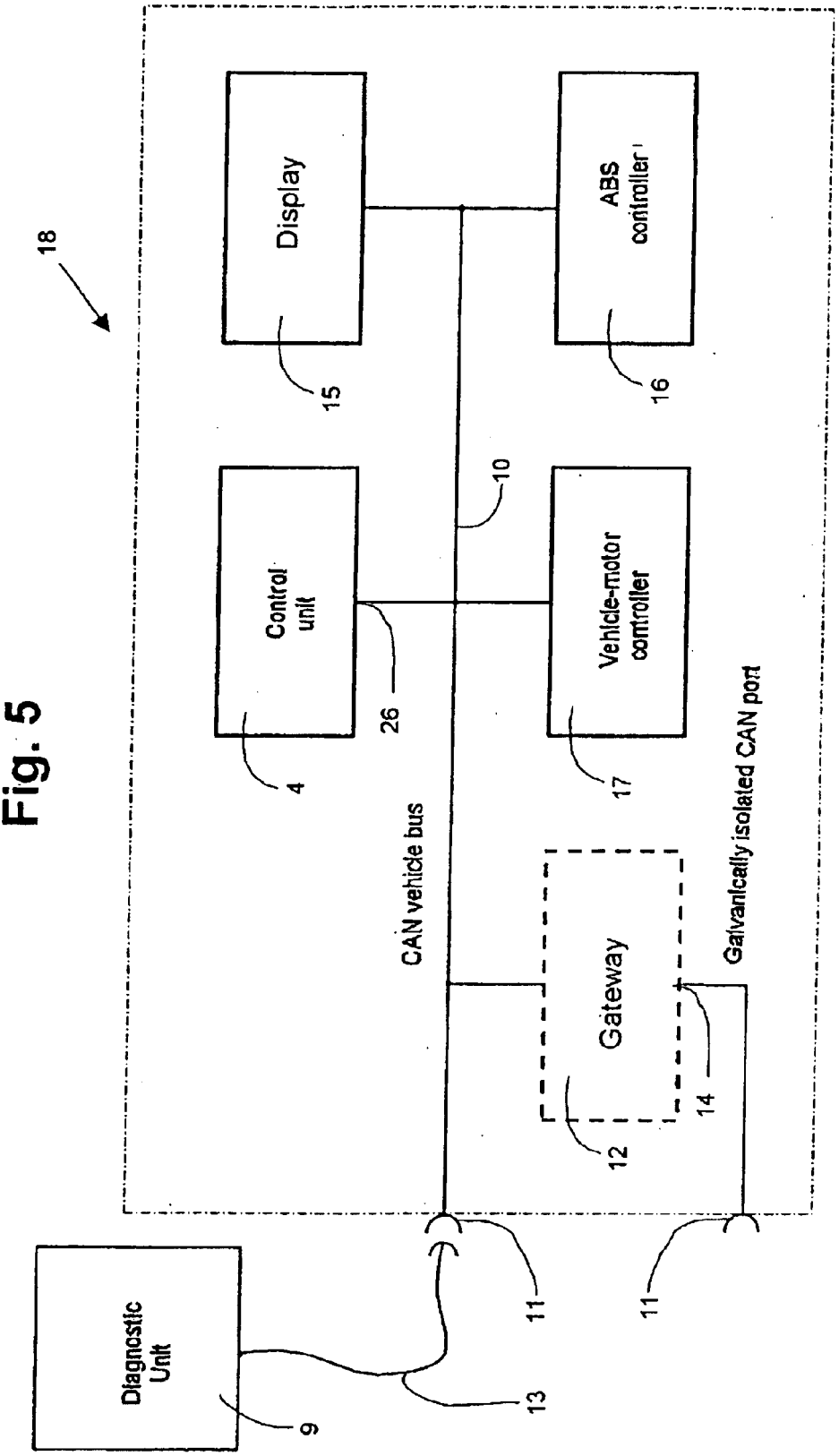

METHOD FOR PROGRAMMING FLASH EEPROMS IN MICROPROCESSOR-EQUIPPED VEHICLE CONTROL ELECTRONICS

BACKGROUND OF THE INVENTION

The present invention is directed generally to a programming method for an electrically erasable and programmable memory employed in an electronic control unit ("ECU"), especially an ECU of the type used in road vehicles.

In road vehicles equipped with electronically controlled or regulated devices, such as electronic anti-lock brake control, it is common practice to design the microprocessors in the electronic control devices as mask-programmed microprocessors.

Since the advent of the 1-chip microprocessor, which contains an integrated flash electrically erasable and programmable read-only memory ("flash EEPROM"), it has also become possible to use the flash EEPROM area as a program memory for the microprocessor. At first, this capability was exploited mainly for prototype development. Besides prototypes, it has also become common practice in series production to use flash EEPROM memories as program and data memories for the microprocessor.

Currently, both mask-programmed and flash EEPROM-programmed microprocessors are being provided, each for a particular ECU type, the latest valid software version being used as a basis for such ECU type. However, because most software control programs are continuously being improved, the next-higher (later) software version developed is used in the next production series. In other words, the new software version is contained in the program memories of next-higher series-produced units.

As a result of this series-oriented approach, newly developed software versions are not loaded into ECUs of older series, whether they are mask-programmed or flash EEPROM-programmed.

In contrast, it has long been common practice in software engineering, especially for commercially available general data processing programs, to update existing programs, or in other words to overwrite them with a new updated program version, which can be run then. For safety reasons, however, this practice of simply overwriting an old memory state by a new, updated memory state is not recommended for use in control devices used in road vehicles without taking appropriate safety precautions.

Desirably, a given program is permitted to be loaded into only a fully specified ECU compatible with such program. With a newly updated memory state, however, the ECU might not be recognized as compatible. An anti-lock brake system ("ABS") brake-control program is a good example for two reasons: first, by its nature it does not function in a gearbox control unit; second, it might trigger therein erroneous responses that under certain circumstances might negatively affect the vehicle.

Fundamental compatibility between ECU and control program is not the only consideration, however—vehicle type compatibility is also a consideration. For example, it is not recommended to simply overwrite an old ABS control program developed for a specific vehicle type with a newly developed, up-to-date ABS control program that has not been released for that vehicle type.

With newer generations of microprocessors, the use of the flash EEPROM as a program memory, in the case of 1-chip microprocessors, for example, has become steadily more cost-effective. Furthermore, larger flash EEPROM memories are now available.

Inspired by these developments, the vehicle manufacturers are becoming increasingly interested in the capability to update an equipment unit purchased from one controller manufacturer with a new program version.

EP 0 836 739 B1 describes a method for updating a flash EPROM memory (4) of an electronic apparatus (5) via a personal computer (1) connected to the electronic apparatus. Into the memory area (2) of the personal computer there is loaded, among other information, the reprogramming code (3) for the flash EPROM device (4). Furthermore, as part of memory area (2), a random access memory (RAM (6)) is provided in which an executable program code is stored. After communication is established between the personal computer and the electronic apparatus, the executable program is loaded into a random access memory (RAM (7)) provided in the electronic apparatus (5) and is activated after correct transfer has been verified. Using the activated executable program, the reprogramming code (3) is loaded into the flash EPROM (4) of the electronic apparatus, and the updating process is completed by RESET of the personal computer. No verification measures are provided for identification of the electronic apparatus.

A conventional diagnostic unit of the type used in motor vehicle shops for many types of electrical and electronic maintenance tasks can also be used for programming. For this purpose, the connecting cable of the diagnostic unit is connected to the vehicle via a diagnostic connector mounted thereon, after which the diagnostic unit can communicate through the client/server principle with an ECU installed in the vehicle, the diagnostic unit being the client and the ECU being the server, while communication between the two takes place according to a stipulated diagnostic protocol, such as, for example, the Keyword Protocol 2000 according to International Organization for Standardization ("ISO") standard 14230 ("KWP2000 protocol").

Conventional diagnostic units also offer the capability to transfer data or programs into the ECU by means of a download process. Accordingly, reprogramming of an ECU equipped with a flash EEPROM is possible in principle by using the diagnostic unit.

For this purpose, for example, there takes place between the diagnostic unit and the ECU a dialog, in which, for example, a key code based on a random number is generated by the diagnostic unit and then checked by both units for logical consistency. If logical consistency is found, the download process (corresponding to transfer into the ECU and programming of the flash EEPROM) is initiated by the diagnostic unit and handled in a further dialog with the ECU.

In this process, the access authorization for downloading takes place during the key code dialog. The dialog, however, provides merely for a check as to whether the diagnostic unit and the ECU fit together in terms of their logical structure in the manner provided by the vehicle manufacturer in the diagnostic unit for the ECUs used in the manufacturer's vehicles.

The ensuing download process takes place with, for example, "memorymap.hex" (1), which is discussed in greater detail hereinafter, but which does not contain any information about the ECU itself.

Downloading of a new program by the foregoing process in no way includes a check, derived from the content of the reprogramming code, of suitability of the ECU for the new program. Thus, in itself, it does not offer any kind of protection against misprogramming.

By introducing further steps into the download process, it will be possible to obtain further information, such as the ECU part number. This can be accomplished, for example, either by an operator on the basis of the rating plate of the ECU, or by the diagnostic unit through queries to the ECU. From this information, an operator or the diagnostic unit itself will be able to check whether the ECU is that scheduled for programming. Accordingly, a suitability check can in principle be performed by the operator or the diagnostic unit.

This method, however, has two disadvantages: first, the suitability check is not mandatory; second, the check, on the basis of the ECU part number, for example, can be accomplished only by a comparison with information that is not a direct part of the reprogramming code. Consequently, diverse error sources are created, such as operator error or incorrect instructions for the diagnostic unit. These disadvantages might impair the safety of the process with regard to misprogramming, especially in the case of widespread use in automobile shops.

Accordingly, it is desired to provide a safe method for reprogramming an electrically erasable and programmable memory provided in an ECU that avoids the disadvantages associated with prior art methods.

SUMMARY OF THE INVENTION

Generally speaking, in accordance with the present invention, a safe method is provided to reprogram a flash EEPROM in a vehicle ECU such that negative affects on the vehicle are avoided.

According to a preferred embodiment of the present invention, a method for programming an EEPROM of a microprocessor of an ECU (preferably a flash EEPROM and preferably a vehicle ECU) is provided. The method includes the steps of (i) generating a memory-map in a memory area defined in the EEPROM, (ii) generating a description data file which includes an equipment description associated with electronic control unit types acceptable for receiving programming, (iii) generating from the memory-map and the description data file a programming data file which includes the equipment description and the selected programming, (iv) reading the programming data file into a diagnostic device, (v) transferring the programming data file from the diagnostic device to the ECU, (vi) utilizing the ECU to determine, based on the equipment description, if the ECU corresponds to a control unit type acceptable for receiving the selected programming, and (vii) by the ECU itself, programming the EEPROM of the ECU in a manner specified by the programming data file when the ECU corresponds to a control unit types acceptable for receiving such programming.

The present invention redefines the function of the diagnostic unit, which in the prior art is used as a central test device. In the inventive method, the diagnostic unit of the automobile shop is also used for loading programming data into the ECU, and so the key code dialog between diagnostic unit and ECU discussed above can also take place. However, the critical check of compatibility of the ECU with the code of the new program is undertaken by the ECU itself on the basis of data transmitted to the ECU. The check actions of the diagnostic unit itself may take place additionally, but, as such, have less importance since according to the invention the diagnostic unit is used merely for data transmission.

The inventive method has the advantage that all safety-relevant checks are performed by the program of the ECU itself, thus practically precluding errors.

The invention also has the advantage that it can be used in the field by maintenance personnel employed in the automobile shop, even though such personnel typically do not have special programming knowledge.

A further advantage of the invention is that any manipulation of programming data is safely recognized by the ECU.

One embodiment of the present invention has the advantage that the data for programming in the field exist as encoded data, thereby safeguarding the confidentiality of the object code during distribution. This is important for protection of the know-how of the ECU manufacturer.

Accordingly, it is an object of the present invention to provide a safe method for reprogramming a flash EEPROM in a vehicle ECU.

Still other objects and advantages of the present invention will in part be obvious and will in part be apparent from the specification.

The present invention accordingly comprises the various steps and the relation of one or more of such steps with respect to each of the others, and embodies features of construction, combinations of elements, and arrangement of parts which are adapted to effect such steps, all as exemplified in the following detailed disclosure, and the scope of the invention will be indicted in the claims.

BRIEF DESCRIPTION OF THE DRAWINGS

For a fuller understanding of the invention, reference is had to the following description taken in connection with the accompanying drawing in which:

FIG. 1 is a flow chart depicting process steps for safely reprogramming an ECU according to a preferred embodiment of the method of the present invention;

FIGS. 2a–f depict files used in a preferred embodiment of the reprogramming method according to the present invention including a memory-map file, a description data file for the ECU, and a programming data record file;

FIGS. 3a–f depict expanded embodiments of the description data file depicted in FIG. 2c according to the present invention, specifically:

FIG. 3a shows a description data file containing a plurality of hardware numbers, FIG. 3b shows a description data file in which a hardware number is restricted by a range of serial numbers, FIG. 3c shows a description data file in which a hardware number is restricted by a software number, FIG. 3d shows a description data file in which a hardware number is restricted both by a range of serial numbers and by a software number, FIG. 3e shows a description data file containing a plurality of hardware numbers, in which a hardware number is restricted by a plurality of ranges of serial numbers and by a plurality of software numbers, and FIG. 3f shows a description file containing two memory-map files and two hardware numbers, in which each memory-map file is allocated to one hardware number;

FIG. 5 is a simplified block diagram of vehicle electronics according to a preferred embodiment of the present invention.

DETAILED DESCRIPTION OF THE PREFERRED EMBODIMENTS

Figure 4:
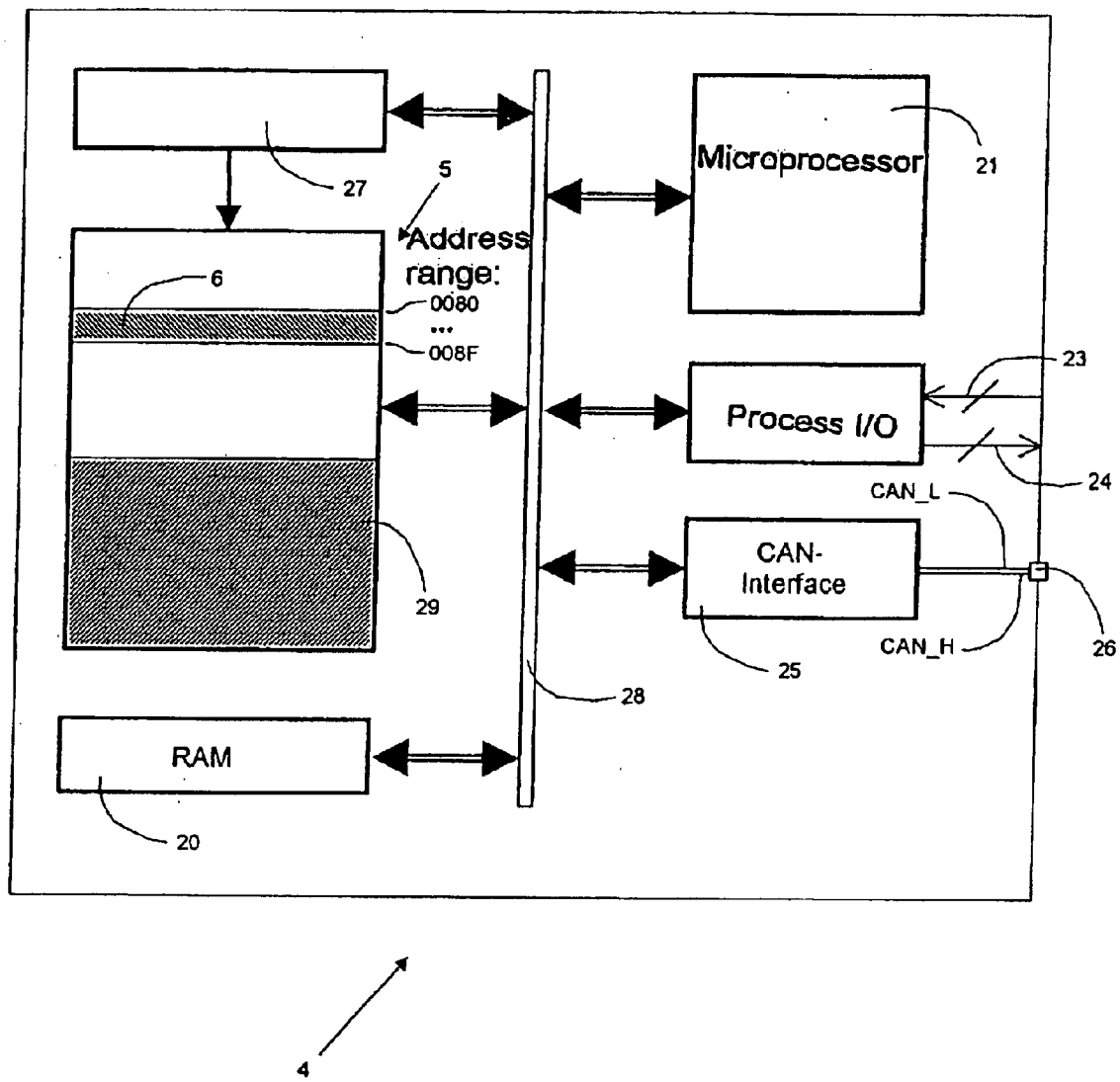
FIG. 4 is a block diagram of an ECU according to a preferred embodiment of the present invention.

Referring now to FIG. 4, there is shown a block diagram depicting an ECU (4) containing an electrically erasable and writable memory (5) designed, for example, as a flash EEPROM, a RAM (20), a microprocessor (21), a process interface (22) with inputs (23) for sensors used by ECU (4), and outputs (24) for connection of actuators driven by ECU (4). Also provided are a CAN interface (25), which makes a CAN connector (26) available for the twisted pair of leads CAN_H and CAN_L of a CAN vehicle bus (10) (FIG. 5), and a flash EEPROM programming device (27). All the above units are preferably linked in known manner by an address and data bus (28).

As is common practice, microprocessor (21) is provided for control of the other units. The system program for microprocessor (21) is installed in a program area (29) of the flash EEPROM where the higher address memory area can also reside. The test and programming steps performed as explained hereinafter by ECU (4) in connection with the inventive reprogramming method are all executed by the system program, and so system program area (29) is not changed during operation of the ECU.

Memory cells in flash EEPROM (5) can be erased and written by means of flash EEPROM programming device (27), and, so, ECU (4) is capable of changing its own memory.

In the address area of flash EEPROM memory (5) there is provided a change area (6) having the address range 0080 to 008F. As explained hereinafter, this area will be overwritten with a particular data pattern.

Therefore, flash EEPROM memory (5) can be designed both as a program memory and as a data memory. In other embodiments, it is also possible to provide a plurality of flash EEPROM memories, wherein some of the memories can be used as data memories and others as program memories. The system program can also be contained in a fixed program memory, which can be mask-programmed, for example. It is also possible to integrate some or all of the units in a single chip, so that parts of the logic or the entire logic of ECU (4) is contained in this chip.

The programming method for at least one area, namely change area (6) in flash EEPROM memory (5), can be divided into seven steps (FIG. 1).

In a first step, a memory-map (1) for change area (6) is generated in flash EEPROM memory (5). This can be accomplished by using programs suitable for this purpose, such as, for example, compilers, assemblers, linkers, HEX converters or similar programs. Any format that is standard for diagnostic units can be chosen for the format of the memory-map file. One example is the Motorola S Records format.

In the embodiment depicted in FIG. 2b, the format of the memorymap.hex file (1) is based on Intel Hex Format, which represents one of the most common formats in diagnostic and programming units. This file is based on the memory-map illustrated in tabular form in FIG. 2a, where the hexadecimal contents FF to F0 are entered in the 16 memory cells of hex addresses 0080 to 008F. This test pattern is selected for purposes of clarity, however, it should be appreciated that other patterns can be employed.

The memorymap.hex file (1) consists of two records, a first data record with a load offset (which defines the start address) of 0080h, and a second end-of-file record. In Intel Hex Format, the first five bytes—shown with a single underline in FIG. 2b—of a record beginning with the record mark ":" are used for identification of the record, and thus represent the record header. As the last byte of a record there is delivered a checksum—which is double-underlined in FIG. 2b. Thus, the data in the first record of memorymap.hex file (1) represent the 16 data bytes FFh to F0h in the address sequence shown in FIG. 2a.

As shown in FIG. 1, description data are needed to continue the process, and they are generated in a second step. A description data record contains an equipment description of the ECUs authorized for programming. In the embodiment depicted in FIG. 2c, the description data set is constructed as the text file "description.txt" (2). It contains a hardware product number, which describes a fully defined equipment version of an ECU; for simplicity, it is referred to hereinafter as the "hardware number." At least one hardware number is entered in a description data set, as is shown in the embodiment depicted in FIG. 2c.

The term "hardware number" encompasses any clear identifier of a particular equipment state, which is defined, for example, by a sequence of numeric characters. As an alternative example, there can be chosen a sequence of alphanumeric characters or even a graphic notation, such as, for example, a bar code. In the case of graphic notation, the text format can be replaced by a correspondingly different file type. The text format chosen in the embodiment depicted in FIG. 2c is advantageous because of its simplicity and clarity, since its content is self-evident from the text, without any further explanation, and can also be amplified very clearly by comments in clear text. Data file description.txt (2) according to FIG. 2c contains, for further processing, the name of the input file with which the data file is to be processed, namely memorymap.hex file (1) according to FIG. 2b and, as explained hereinafter, the name of the output file, which represents the result of processing.

As shown in a third step in FIG. 1, a programming data set in the form of the "programmingdata.hex" file (3) is generated from the memory-map of memorymap.hex file (1) and the description data of description.txt file (2) by using a programming data converter (7). The programmingdata.hex file (3) is illustrated in FIG. 2f; the data content is explained in FIG. 2d; and the file format in FIG. 2e.

Intel Hex Format is again chosen for file (3) of the programming data set according to FIG. 2f; in this "mother format," the data according to FIG. 2d are embedded in a record structure having the "daughter format" according to FIG. 2e. File (3) of the programming data set contains both the information, necessary for programming, the memory-map from file (1) and the equipment description from file (2) of the description data set.

Corresponding to the format explanations under FIG. 2e, there is generated a first record of type 02h, which is based on the assumption of a ten digit hardware number, so that there is no need to specify a record length. In the content of the programming data record according to FIG. 2d, therefore, the first byte of the record type "02h" and bytes two to six represent a direct transposition of the ten digit hardware number in file (2) of the description data set. This is followed by a record of type "06h" containing the start address in 32-bit form; because of the fixed length of 4 bytes, there is also no need to specify a length for this record type. Byte numbers 7 to 11 in FIG. 2d therefore represent the start address record. According to FIG. 2e, this is followed by a data record of type "07h", for which the size of the data record, expressed as the length, is given as "10h", followed by the 16 data bytes of the memory-map test pattern. This record represents bytes 14 to 29 in the content according to FIG. 2d.

File (3) of the programming data set contains two data records and an end-of-file record. Again, the record headers are single-underlined and the end-of-file records double-underlined (FIG. 2f). The non-underlined parts therefore represent the transferred data which, as is evident from the first two records of file (3) of the programming data set, are the data bytes numbered 1 to 29, the content of the programming data set according to FIG. 2d. Since the start address is stored in the form of a data record in file (3) of the programming data set, there is no need to specify this address in the record header of the first two records; a record length of 10h is fixed in the first record, which therefore also contains the bytes numbered 1 to 16 according to FIG. 2d as data, whereas the remaining bytes numbered 13 to 29 according to FIG. 2d, corresponding to a record length of 0Dh (decimal 13), are transferred in the second record. The load offset in the header of the second record is fixed at 10h (decimal 16), corresponding to the data length of the first record.

As shown in FIG. 1, the programming data set can, if desired, as it is being generated, be encoded (block 8) by an encoding program. This has the advantage that file (3) of the programming data set is transferred only in encoded form during its further progress, to be explained hereinafter, thus ensuring that the know-how of the ECU manufacturer contained in the object code of the program is not revealed.

It is also possible to compress the content of the programming data set and then to encode it if necessary.

The steps discussed above are usually performed by the ECU manufacturer. They represent individual working steps toward planned reprogramming of a unit, and timewise coordination of these individual steps is in principle not required.

According to FIG. 1, once file (3) of the programming data set has been converted to a form suitable for distribution, by e-mail or regular mail, for example, it is read into a diagnostic unit (9) in a fifth step. This diagnostic unit (9) can be located in the manufacturing line of the vehicle manufacturer, where ECU (4) is installed in a corresponding vehicle (FIG. 5), although this is a relatively atypical case, since new units are usually supplied in factory-programmed form by the ECU manufacturer to the vehicle manufacturer. Typically, this programming unit is located in the shop of a vehicle manufacturer (or in an independent shop), where it is used in the manner explained above for reprogramming ECU (4).

Programming data file (3) can then be transferred into ECU (4) using data transfer means disposed between diagnostic unit (9) and the ECU. In principle, the programming data file can be transferred in Intel Hex Format for this purpose. Typically, however, the diagnostic unit already interprets the Intel Hex Format of the programming data file and then transfers the content of the programming data file to the ECU in a manner predetermined by the diagnostic protocol.

The transfer takes place particularly advantageously if ECU (4) does not have to be demounted or otherwise handled in some way. This is the case if connecting cable (13) of diagnostic unit (9) merely has to be connected to diagnostic connector (11) of the vehicle and the data transfer means permit direct transfer to the ECU, as is discussed hereinafter in connection with FIG. 5.

It should be understood that any kind of electronic unit can be used in principle instead of a diagnostic unit (9) to accomplish the transfer of programming data file (3) into ECU (4), provided only that it is capable of communicating electrically with ECU (4) (whether or not demounted) via an interface (26) of any suitable design and of ensuring transfer by use of a protocol of any suitable type. In its expanded interpretation within the meaning of the invention, the term "diagnostic unit" therefore also encompasses all such data transfer units.

In a sixth step, ECU (4), using its system program in area (29) of flash EEPROM memory (5), checks whether it belongs to the range of ECUs authorized by programming data file (3). This check is performed on the basis of the equipment description in the programming data record. If encoding had been applied during generation of the programming data, then the encoded data must first be decoded before being checked by the ECU; logically similar steps will be effected if data compression is applied before data transfer.

If ECU (4) determines in the sixth step that it belongs to the range of authorized units, then, in a seventh and final step, change area (6) in flash EEPROM memory (5) is programmed by the ECU itself in the manner specified by programming data file (3). Flash EEPROM programming device (27) discussed above is used for this purpose.

In contrast to the first to third steps which, as explained, do not necessarily have to be coordinated timewise, the subsequent steps are performed as a coordinated process, either by the vehicle manufacturer or, in a particularly advantageous alternative, as explained, in the shop.

FIGS. 3a–f show files of the description data with expanded equipment description for the authorized ECUs.

In description data file (2a) according to FIG. 3a, there are specified three different hardware numbers, meaning that all (logical OR) ECUs (4) having the equipment version according to these hardware numbers are authorized for programming.

In description data file (2b) according to FIG. 3b, a hardware number is followed by a range of serial numbers; this means that the equipment version described by the hardware number is restricted to this range of serial numbers (logical AND); it should be pointed out that merely a single serial number instead of a range of serial numbers may be specified.

In description data file (2c) according to FIG. 3c, the hardware number is followed by a software number, which identifies a particular software version of the equipment version of ECU (4) defined by the hardware number; this means that the equipment version described by the hardware number is restricted by the software version described by the software number (logical AND). A plurality of software numbers may also be specified, in which case the restriction refers to the choice of specified software numbers (logical OR).

In description data file (2d) according to FIG. 3d, the hardware number is followed both by a range of serial numbers and by a software number; this means that the equipment version of ECU (4) described by the hardware number is restricted both by a serial number or a range of serial numbers (logical AND), and by a software number or, as the case may be, by a plurality of software numbers (logical AND).

In description data file (2e) according to FIG. 3e, three hardware numbers are specified, and the last hardware number is restricted both by two ranges of serial numbers and by the software versions of four software numbers.

In FIG. 3f there is shown a description data file (2f), in which there are specified two memory-map files and two hardware numbers (each further restricted by software numbers and/or serial numbers); in the structure of the programming data file based on this description data file, the one memory-map is accepted only in units having the associated one hardware number, and the other memory-map is accepted only in units having the other hardware number. In this way, therefore, different units can be programmed differently with one programming data file.

It should be appreciated that the description data can contain further identifiers specific to equipment units, components or software, thus permitting further refinement of the restrictions. For example, an identification of the microprocessor can also be added to the description data.

As explained, a description data file (2, 2a–f) according to FIG. 2 and FIGS. 3a–f is constructed as a text file containing individual lines of text. As already shown analogously hereinabove, there exists a series of fully defined words, each of which is active as an OP key, or, in other words, as a keyword for a particular operation. The operand belonging to such an operation is embedded in two quotation marks in the following text. All of the other text can be freely chosen, and so detailed comments in clear text are also possible within the text file.

As explained, the programming data converter (7) generates programming data file (3) from description data file (2) and memory-map file (1) and, during this data-processing sequence, it inserts the operations contained in the description data set as the set of daughter records subordinate to the mother format, a particular record type being defined for each operation. The correlation of an aforesaid record type with a data record OP key—further record types can also be defined—is illustrated in the following table (Table 1):

TABLE 1

| OP key | Record Type |
| --- | --- |
| Input | — |
| Output | — |
| Hardware number | 02 |
| Serial number | 03 |
| Software number | 04 |

It should be understood that the combination of a file describing the memory-map and a file containing the equipment description to obtain the file of a programming data set can also be achieved in other ways in practice; to implement the invention, it is merely necessary that the programming data set includes, besides the memory-map, an equipment description sufficient to perform the compatibility check unambiguously in the ECU.

FIG. 5 illustrates data transfer means for transfer of programming data file (3) into ECU (4). As an example, a vehicle may be provided with, besides ECU (4), an ABS control unit (16) and a control unit for a vehicle-engine controller (17). Conventionally, these units are linked to one another via a CAN vehicle bus (10), to which there is also connected, for example, a dashboard display (15) in the driver's cab.

Via dashboard display (15), ECU (4) itself is able, if necessary, to present diagnostic data indicating whether the flash EEPROM programming in the ECU has been successful or unsuccessful.

To link diagnostic unit (9) to the vehicle electronics (18), these electronics are provided with a 16-pin diagnostic connector (11) according to ISO/DIN 15031-3, to which there are also connected the twisted pair CAN_H and CAN_L of CAN vehicle bus (10) (on diagnostic connector (11), contact No. 6 is reserved for CAN_H and contact No. 14 is reserved for CAN_L).

Diagnostic unit (9) is first connected by inserting connecting cable (13) into diagnostic connector (11) on the vehicle.

It should be appreciated that, for example, the K-line can also be used for data transfer, provided naturally that the K-line is installed at all (on diagnostic connector (11), contact No. 7 is reserved for the K-line).

One disadvantage of the CAN port explained in the foregoing is that the CAN vehicle bus is unbuffered. In other words, it is connected to the diagnostic connector without being potentially isolated. To achieve a floating CAN port, the option exists—as indicated by the broken line in FIG. 5—of providing a CAN gateway (12), which is also connected to a diagnostic connector (11) via its galvanically isolated CAN port (14) in order to establish the link to diagnostic unit (9). In this case, however, CAN gateway (12) is installed as an additional module in the vehicle, thus leading to higher basic costs.

To avoid these costs, transfer between diagnostic unit (9) and ECU (4) in the vehicle can also take place by radio means; for this purpose, a radio module is plugged onto diagnostic connector (11) and is activated by radio signals from diagnostic unit (9); this transfer path is inherently potentially isolated.

The use of such a radio link even brings a future vision closer to reality: automatic on-line updating of the programming of ECUs while they are still in service, without any need whatsoever for a shop visit; for this purpose the radio module is permanently installed in the vehicle, and is activated by radio directly from diagnostic unit (9) in the shop, in order to execute the programming dialog. Thus, the invention already today permits the choice of a particular unit type or even the selective choice of an individual ECU.

Accordingly, the present invention provides a method for safe programming of an electrically erasable and programmable memory (e.g., a flash EEPROM) in a control unit (e.g., a vehicle ECU) utilizing a programming data set that is read into the control unit and evaluated thereby. The programming data set contains, besides the memory-map to be programmed, an equipment description of the control units acceptable for programming so that the control unit can perform an identity check to determine whether it itself belongs to the range of acceptable control units. If the identity check indicates that it is acceptable for programming, reprogramming is performed using a programming device provided in the control unit itself.

In accordance with the present invention, all safety-relevant checks are performed by the program of the ECU itself, and any manipulation of programming data is safely recognized by the ECU. Also, the invention can be used in the field by maintenance personnel employed in the automobile shop as it does not require special programming knowledge.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for programming an electrically erasable and programmable memory of a microprocessor of an electronic control unit, said electronic control unit being at least one of a controller and regulator associated with at least one electronic system of a road vehicle, the method comprising the steps of:
   a. generating at least one memory-map in a memory area defined in said electrically erasable and programmable memory, said memory area being at least one of (i) a program memory, (ii) a data memory and (iii) a combination program and data memory,
   b. generating a description data file, said description data file including an equipment description associated with electronic control unit types acceptable for receiving at least one preselected program, said description data file further including at least one hardware number corresponding to an equipment version associated with at least one of said electronic control unit types,
   c. generating from said memory-map and said description data file a programming data file, said programming data file including said equipment description and said at least one preselected program,
   d. reading said programming data file into a diagnostic device,
   e. transferring said programming data file from said diagnostic device to said electronic control unit,
   f. utilizing said electronic control unit, determining based on said equipment description if said electronic control unit corresponds to at least one of said electronic control unit types acceptable for receiving said at least one preselected program, and
   g. by said electronic control unit itself, programming said at least one preselected program into said electrically erasable and programmable memory of said electronic control unit in a manner specified by said programming data file when said electronic control unit corresponds to at least one of said electronic control unit types acceptable for receiving said at least one preselected program.

2. The method according to claim 1, wherein steps a to d are effected in a manner that is one of coordinated timewise and un-coordinated timewise, and steps e to g are effected in a manner that is coordinated timewise.

3. The method according to claim 1, wherein said equipment description associated with said electronic control unit types acceptable for receiving said at least one preselected program includes a plurality of hardware numbers corresponding to equipment versions associated with a plurality of said electronic control unit types.

4. The method according to claim 1, wherein said equipment version is restricted by one of a serial number and a range of serial numbers.

5. The method according to claim 1, wherein said equipment version is restricted by one of a software number associated with a software version and a range of software numbers associated with a software version.

6. The method according to claim 1, wherein said equipment version is restricted by (i) one of a serial number and a range of serial numbers and (ii) one of a software number associated with a software version and a range of software numbers associated with a software version.

7. The method according to claim 1, wherein said step of transferring said programming data file from said diagnostic device into said electronic control unit includes transferring said programming data file serially as a sequence of data segments.

8. The method according to claim 1, wherein said step of generating said programming data file includes encoding said programming data file, and wherein said step of transferring said programming data file to said electronic control unit includes decoding said programming data file utilizing said electronic control unit.

9. The method according to claim 1, wherein said step of generating said programming data file includes compressing said programming data file, and wherein said step of transferring said programming data file to said electronic control unit includes decompressing said programming data file utilizing said electronic control unit.

10. The method according to claim 1, wherein said programming data file includes at least one checksum, and further comprising the step of checking said checksum utilizing said electronic control unit.

11. The method according to claim 1, wherein said step of transferring said programming data file from said diagnostic device to said electronic control unit is effected using radio transmission and reception means.

12. The method according to claim 1, wherein steps a to g are effected remotely while said electronic control unit is in service.

13. The method according to claim 1, wherein said electrically erasable and programmable memory is a flash electrically erasable and programmable memory.

* * * * *